(12) United States Patent
Giere et al.

(10) Patent No.: US 6,247,787 B1
(45) Date of Patent: Jun. 19, 2001

(54) PRINT MODE FOR IMPROVED LEADING AND TRAILING EDGES AND TEXT PRINT QUALITY

(75) Inventors: Matthew D Giere; Ronald A. Askeland, both of San Diego; Clayton L Holstun, San Marcos, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/562,264

(22) Filed: Apr. 29, 2000

(51) Int. Cl.[7] .............................. B41J 2/145; B41J 2/15; B41J 29/38
(52) U.S. Cl. .................................. 347/40; 347/9
(58) Field of Search ..................... 347/40, 41, 9

(56) References Cited

U.S. PATENT DOCUMENTS 5,661,507   8/1997   Sperry ........................................ 347/9
6,161,918 * 12/2000 Bailey et al. ........................... 347/40

* cited by examiner

Primary Examiner—Thinh Nguyen
(74) Attorney, Agent, or Firm—Dennis G. Stenstrom

(57) ABSTRACT

Described is a method for incremental printing with an inkjet swath printer by depositing multiple drops of an ink from a printhead in each column of an image, in each scanning pass of the printhead over a print medium by obtaining the image, analyzing the image to determine which drops of ink will define leading and trailing edges in each row of the image element with respect to a scanning direction, removing at least one drop of ink preceding the drop defining the trailing edges in each of the rows, removing at least one drop of ink after the drop defining the leading edges in each of the rows and depositing the remaining drops of the ink on the medium while passing the printhead over the media in the scanning direction. Also described is a method of printing with an inkjet printing system scanning over a print medium by providing a printhead having a supply of ink and a plurality of ink ejection chambers for ejecting ink onto the print medium, each of the ink ejection chambers depositing the ink onto a corresponding row, the ink ejection chambers ejecting ink drops in a range of frequencies between a base firing frequency and a maximum firing frequency, obtaining an image, analyzing the image to determine which drops of ink will define leading and trailing edges in each row of the image element with respect to a scanning direction, ejecting the drops of ink defining the leading trailing edges in each of the rows at an ejection frequency less than the maximum frequency and depositing the remaining drops of the ink on the medium while passing the printhead over the media in the scanning direction.

20 Claims, 9 Drawing Sheets

PRINT MODE FOR IMPROVED LEADING AND TRAILING EDGES AND TEXT PRINT QUALITY

CROSS-REFERENCE TO RELATED APPLICATIONS

This application is related to U.S. patent application Ser. No. 09/016,478, filed Jan. 30, 1998, entitled "Hybrid Multi-Drop/Multi-Pass Printing System." The foregoing commonly assigned patents and patent applications are herein incorporated by reference.

FIELD OF THE INVENTION

This invention relates to thermal inkjet printers, and more particularly to printmodes.

BACKGROUND OF THE INVENTION

Thermal inkjet hardcopy devices such as printers, graphics plotters, facsimile machines and copiers have gained wide acceptance. These hardcopy devices are described by W. J. Lloyd and H. T. Taub in "Ink Jet Devices," Chapter 13 of *Output Hardcopy Devices* (Ed. R. C. Durbeck and S. Sherr, San Diego: Academic Press, 1988). The basics of this technology are further disclosed in various articles in several editions of the *Hewlett-Packard Journal* [Vol. 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994)], incorporated herein by reference. Inkjet hardcopy devices produce high quality print, are compact and portable, and print quickly and quietly because only ink strikes the paper.

An inkjet printer forms a printed image by printing a pattern of individual dots at particular locations of an array defined for the printing medium. The locations are conveniently visualized as being small dots in a rectilinear array. The locations are sometimes "dot locations", "dot positions", or pixels". Thus, the printing operation can be viewed as the filling of a pattern of dot locations with dots of ink.

Inkjet hardcopy devices print dots by ejecting very small drops of ink onto the print medium and typically include a movable carriage that supports one or more printheads each having ink ejecting nozzles. The carriage traverses over the surface of the print medium, and the nozzles are controlled to eject drops of ink at appropriate times pursuant to command of a microcomputer or other controller, wherein the timing of the application of the ink drops is intended to correspond to the pattern of pixels of the image being printed.

The typical inkjet printhead (i.e., the silicon substrate, structures built on the substrate, and connections to the substrate) uses liquid ink (i.e., dissolved colorants or pigments dispersed in a solvent). It has an array of precisely formed orifices or nozzles attached to a printhead substrate that incorporates an array of ink ejection chambers which receive liquid ink from the ink reservoir. Each chamber is located opposite the nozzle so ink can collect between it and the nozzle and has a firing resistor located in the chamber. The ejection of ink droplets is typically under the control of a microprocessor, the signals of which are conveyed by electrical traces to the resistor elements. When electric printing pulses heat the inkjet firing chamber resistor, a small portion of the ink next to it vaporizes and ejects a drop of ink from the printhead. Properly arranged nozzles form a dot matrix pattern. Properly sequencing the operation of each nozzle causes characters or images to be printed upon the paper as the printhead moves past the paper.

In an inkjet printhead the ink is fed from an ink reservoir integral to the printhead or an "off-axis" ink reservoir which feeds ink to the printhead via tubes connecting the printhead and reservoir. Ink is then fed to the various vaporization chambers either through an elongated hole formed in the center of the bottom of the substrate, "center feed", or around the outer edges of the substrate, "edge feed."

The ink cartridge containing the nozzles is moved repeatedly across the width of the medium to be printed upon. At each of a designated number of increments of this movement across the medium, each of the resistors is caused either to eject ink or to refrain from ejecting ink according to the program output of the controlling microprocessor. Each completed movement across the medium can print a swath approximately as high as the number of nozzles arranged in a column of the ink cartridge multiplied times the distance between nozzle centers. After each such completed movement or swath the medium is moved forward the height of the swath or a fraction thereof, and the ink cartridge begins the next swath. By proper selection and timing of the signals, the desired print is obtained on the medium.

Lines, text and graphics are normally printed with uniform density. In one or two pass printmodes, this results in a high firing frequency for black and saturated colors. High firing frequency has a negative effect on the drops that are ejected: drop velocity, drop volume, drop shape and drop trajectory. Output printed with high frequency and uniform density text and lines exhibits defects that are the result of the sub-optimal firing conditions. Accordingly, there is a need for a solution to the problem of text and graphics degradation and, more generally, edge roughness that is associated with high frequency firing.

SUMMARY OF THE INVENTION

The present invention provides a method for incremental printing with an inkjet swath printer by depositing multiple drops of an ink from a printhead in each column of an image, in each scanning pass of the printhead over a print medium by obtaining the image, analyzing the image to determine which drops of ink will define trailing edges in each row of the image element with respect to a scanning direction, removing at least one drop of ink preceding the drop defining the trailing edges in each of the rows and depositing the remaining drops of the ink on the medium while passing the printhead over the media in the scanning direction. Another embodiment provides a method for incremental printing with an inkjet swath printer by depositing multiple drops of an ink from a printhead in each column of an image, in each scanning pass of the printhead over a print medium by obtaining the image, analyzing the image to determine which drops of ink will define leading edges in each row of the image element with respect to a scanning direction, removing at least one drop of ink after the drop defining the leading edges in each of the rows and depositing the remaining drops of the ink on the medium while passing the printhead over the media in the scanning direction.

Another embodiment of the present invention is a method of printing with an inkjet printing system scanning over a print medium by providing a printhead having a supply of ink and a plurality of ink ejection chambers for ejecting ink onto the print medium, each of the ink ejection chambers depositing the ink onto a corresponding row, the ink ejection chambers ejecting ink drops in a range of frequencies between a base firing frequency and a maximum firing frequency, obtaining an image, analyzing the image to determine which drops of ink will define trailing edges in each row of the image element with respect to a scanning direction, ejecting the drop of ink defining the trailing edges in each of the rows at an ejection frequency less than the maximum frequency and depositing the remaining drops of the ink on the medium while passing the printhead over the media in the scanning direction. Another embodiment of the present invention is a method of printing with an inkjet printing system scanning over a print medium providing a printhead having a supply of ink and a plurality of ink ejection chambers for ejecting ink onto the print medium, each of the ink ejection chambers depositing the ink onto a corresponding row, the ink ejection chambers ejecting ink drops in a range of frequencies between a base firing frequency and a firing frequency, obtaining an image, analyzing the image to determine which drops of ink will define leading edges in each row of the image element with respect to a scanning direction, ejecting the drop of ink defining the leading edges in each of the rows at an ejection frequency less than the maximum frequency and depositing the remaining drops of the ink on the medium while passing the printhead over the media in the scanning direction.

DETAILED DESCRIPTION OF A PREFERRED EMBODIMENT

Figure 1:
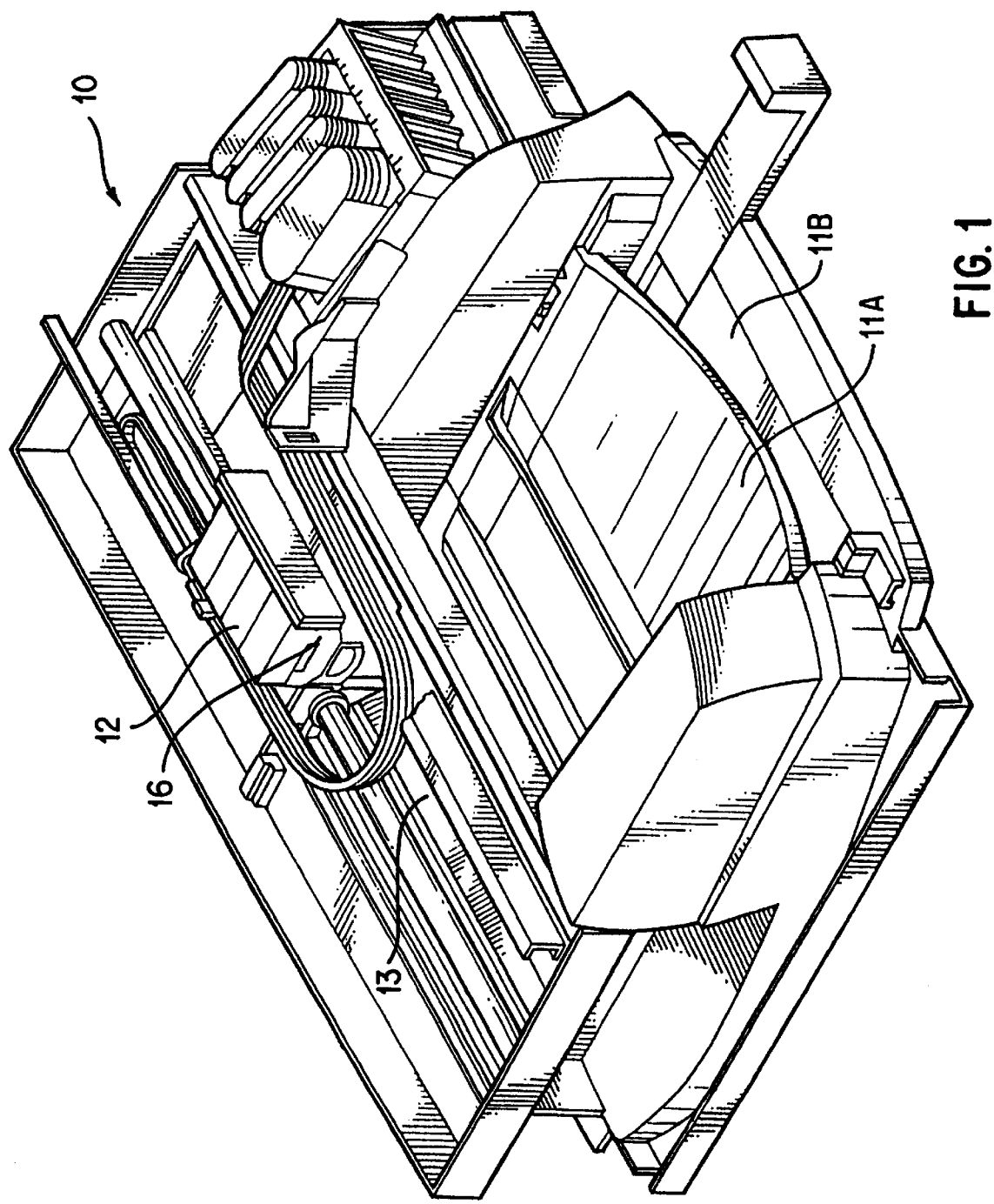
FIG. 1 a perspective view of one embodiment of an inkjet printer incorporating the present invention.

FIG. 1 is a perspective view of one embodiment of an inkjet printer 10 suitable for utilizing the present invention, with its cover removed. Generally, printer 10 includes a tray 11A for holding virgin paper. When a printing operation is initiated, a sheet of paper from input tray 11A is fed into printer 10 using a sheet feeder, then brought around in a U direction to now travel in the opposite direction toward output tray 11B. The sheet is stopped in a print zone 13, and a scanning carriage 16, supporting one or more print cartridges 12, is then passed across a print zone on the sheet for printing a swath of ink thereon. The printing may occur while the carriage is passing in either directional. This is referred to as bi-directional printing. After a single pass or multiple passes, the sheet is then incrementally shifted an amount based on the printmode being used, using a conventional stepper motor and feed rollers to a next position within the print zone 13, and carriage 16 again passes across the sheet for printing a next swath of ink. When the printing on the sheet is complete, the sheet is forwarded to a position above tray 13, held in that position to ensure the ink is dry and then released.

The carriage 16 scanning mechanism may be conventional and generally includes a slide rod, along which carriage 16 slides, a flexible cable (not shown in FIG. 1) for transmitting electrical signals from the printer's controller to the carriage 16 and then to electrodes on the carriage 16 which engage electrical contacts 86 on print cartridges 12 when they are installed in the printer. A motor (not shown), connected to carriage 16 using a conventional drive belt and pulley arrangement, may be used for transporting carriage 16 across print zone 14.

Figure 2:
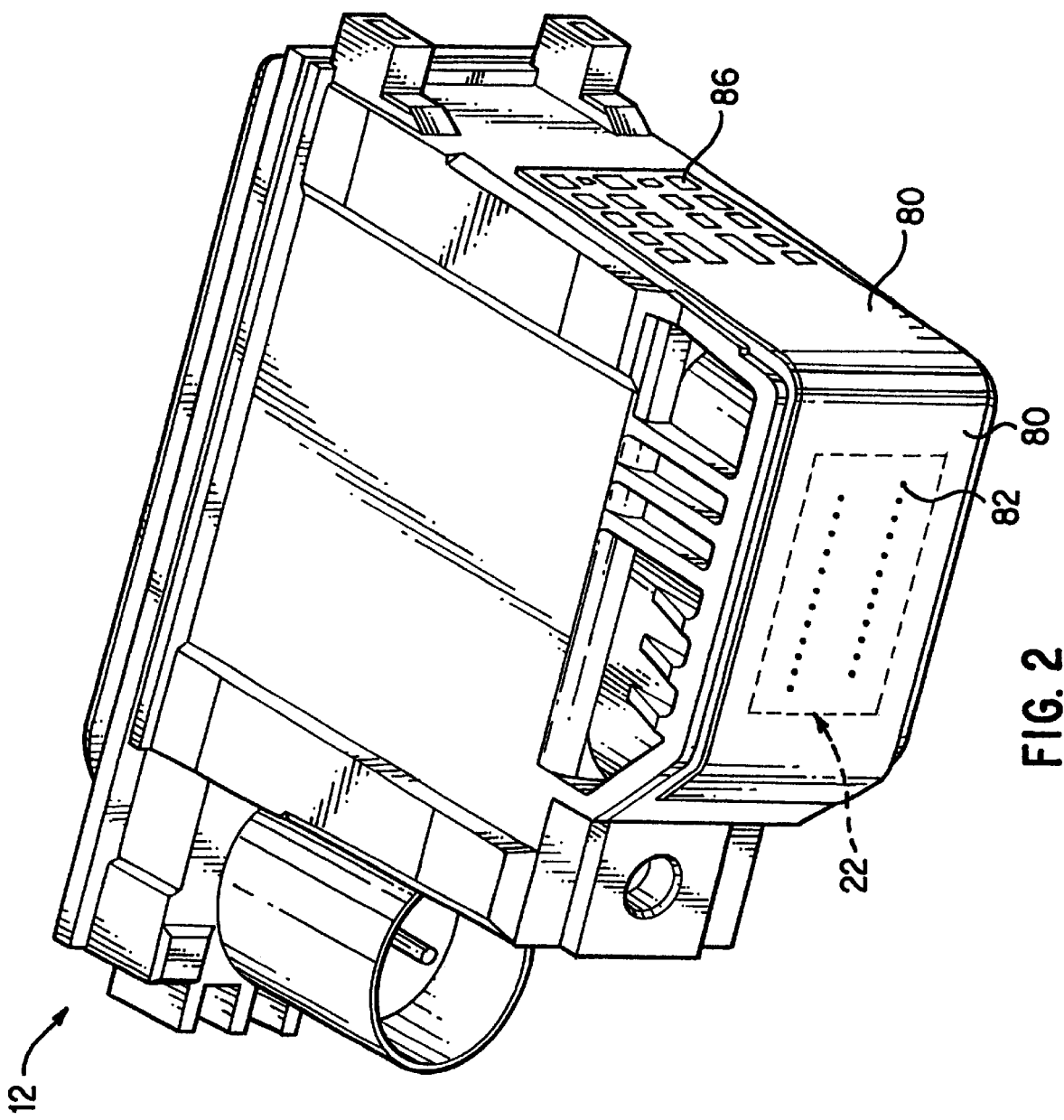
FIG. 2 is a top perspective view of a single print cartridge.

FIG. 2 illustrates a print cartridge 12 having a printhead assembly 22 attached which includes a flexible tape 80 containing nozzles 82 and electrical contact pads 86. The contact pads 86 align with and electrically contact electrodes (not shown) on carriage 16. The print cartridge also includes a memory device for storing calibration information determined on the manufacturing line or subsequently. Values typically include operating voltage, operating energy, turn-on energy, print cartridge resistances including common parasitic resistances and drop volumes. This information can the be read and stored by the printer when the print cartridge is installed in the printer.

Figure 3:
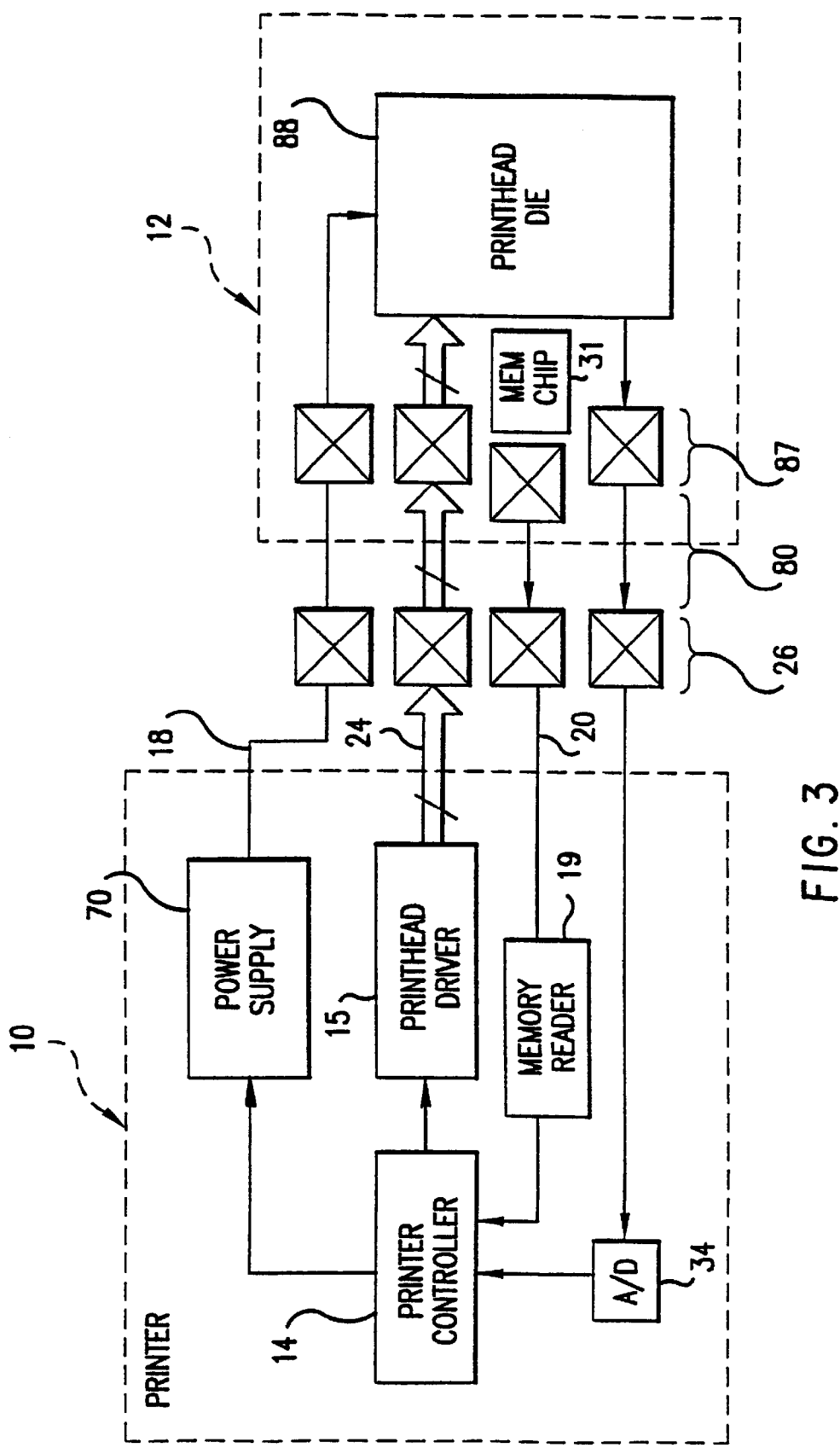
FIG. 3 is a schematic block diagram of a thermal inkjet printing apparatus according to a preferred embodiment of the invention.

FIG. 3 shows a schematic block diagram of an inkjet printer 10 with a connected print cartridge 12. A controller 14 in the printer 10 receives print data from a computer or microprocessor (not shown) and processes the data to provide printer control information or image data to a printhead driver circuit 15. A controlled voltage power supply 17 provides a controlled voltage to a power bus 18. A memory reader circuit 19 in the printer 10 is connected to the controller 14 for transmitting information received from the print cartridge 12 via a memory line 20. The printhead driver circuit 15 is controlled by the controller 14 to send the image data to a printhead die 88 on the print cartridge 12, via a control bus 24.

The cartridge 12 is removably replaceable and is electrically connected to the printer 10 by the control bus 24, power bus 18 and memory line 20. A connector interface 26 has a conductive pin for each line on the printer carriage side contacting a corresponding pad 86 on a flexible circuit tape 80 on the cartridge 12. A memory chip 31 on the cartridge stores printer control information programmed during manufacture of the cartridge and used by the printer during operation. The flex circuit 80 is connected to the printhead die 88 via bonds to electrodes 87. An analog-to-digital converter 34 in the printer is connected to the printhead to receive data from the printhead that indicates the printhead's temperature.

Figure 4:
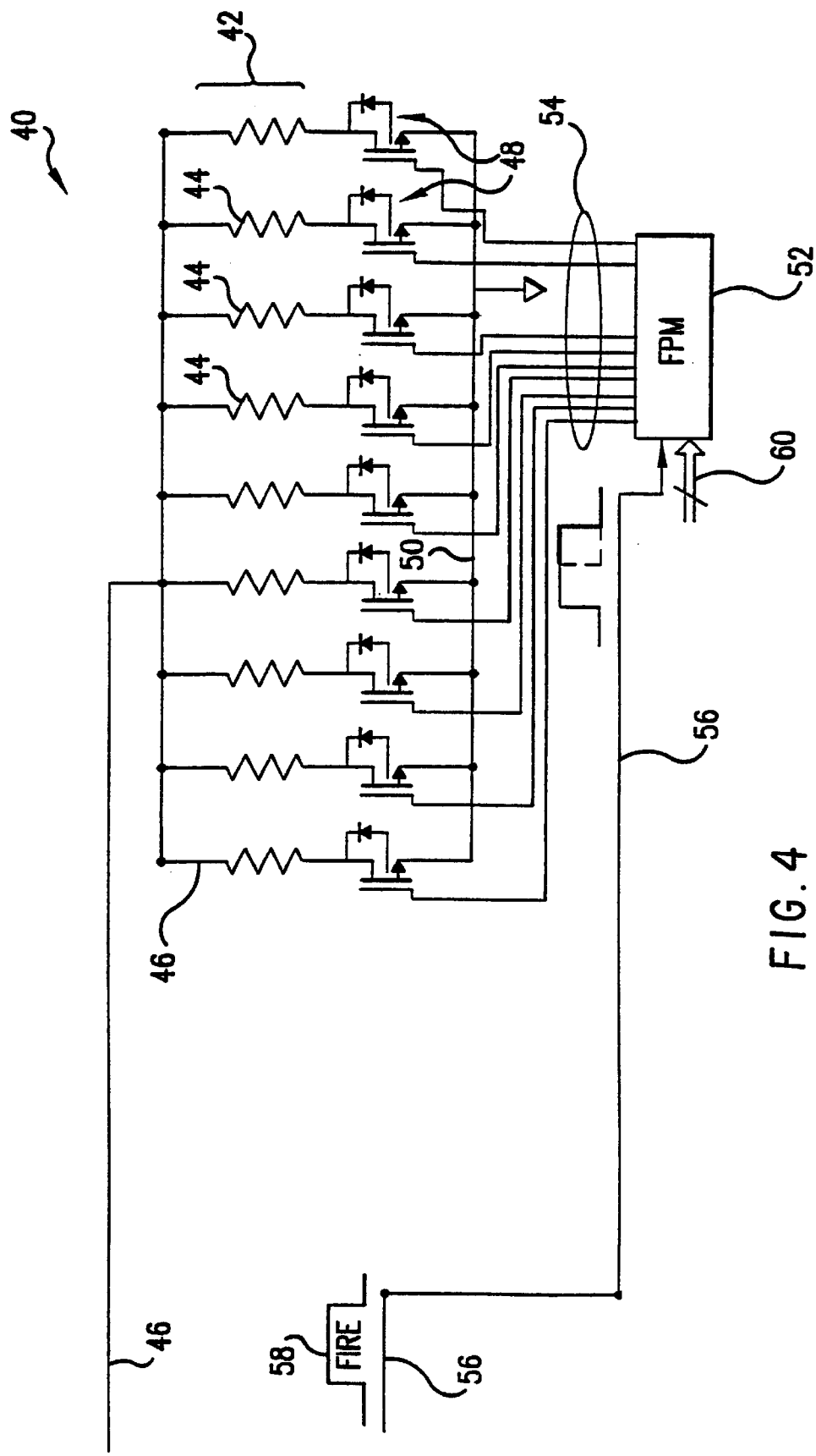
FIG. 4 is a detailed schematic of a printhead circuit of the embodiment of FIG. 2.

FIG. 4 shows a firing control circuit 40 and an exemplary fraction of the many resistors 44 on the printhead 22. Printhead 22 includes substrate 88 having firing resistors 44 and nozzles 82 in tape 80. The firing control circuit 40 resides on the printhead 22 substrate 88 and has a single pad to pad voltage input ("$V_{pp}$") 46 from the power bus 18 commonly connected to a set 42 of thin film firing resistors 44. Each firing resistor 44 is connected to a corresponding firing switch 48 connected to a ground line 50 and having a control input connected to the output 54 of a firing pulse modulator 52. The firing pulse modulator 52 receives print data on a bus 60 and outputs a firing signal on output lines 54 to each selected firing switch 48. To fire a selected group of the resistor set 42, the printer sends an input voltage $V_{pp}$ on line 46, and transmits a full-duration firing pulse 58 on line 56. In response to the firing pulse, the firing pulse modulator 52 transmits the firing pulse 58 to the resistor firing switches 48, causing the selected switches to close and connecting the resistors to ground to allow current flow through the resistors 44 to generate firing energy.

The printhead assembly 22 has a large number of nozzles 82 with a firing resistor 44 associated with each nozzle 82. In order to provide a printhead assembly where the resistors are individually addressable, but with a limited number of lines between the printer 10 and print cartridge 12, the interconnections to the resistors 44 in an integrated drive printhead are multiplexed. The print driver circuitry comprises an array of primitive lines 46, primitive commons 50, and address select lines 54 to control ink ejections elements 44. The printhead 22 may be arranged into any number of multiple similar subsections, such as quadrants, with each subsection being powered separately and having a particular number of primitives containing a particular number of resistors. Specifying an address line 54 and a primitive line 46 uniquely identifies one particular ink ejection element 44. The number of resistors within a primitive is equal to the number of address lines. Any combination of address lines and primitive select lines could be used, however, it is useful to minimize the number of address lines in order to minimize the time required to cycle through the address lines.

Each ink ejection element is controlled by its own drive transistor 48, which shares its control input address select with the number of ejection elements 44 in a primitive. Each ink ejection element is tied to other ink ejection elements 44 by a common node primitive select. Consequently, firing a particular ink ejection element requires applying a control voltage at its address select terminal and an electrical power source at its primitive select terminal. In response to print commands from the printer, each primitive is selectively energized by powering the associated primitive select interconnection. To provide uniform energy per heater ink ejection element only one ink ejection element is energized at a time per primitive. However, any number of the primitive selects may be enabled concurrently. Each enabled primitive select thus delivers both power and one of the enable signals to the driver transistor. The other enable signal is an address signal provided by each address select line only one of which is active at a time. Each address select line is tied to all of the switching transistors 82 so that all such switching devices are conductive when the interconnection is enabled. Where a primitive select interconnection and an address select line for a ink ejection element are both active simultaneously, that particular heater ink ejection element is energized. Only one address select line is enabled at one time. This ensures that the primitive select and group return lines supply current to at most one ink ejection element at a time. Otherwise, the energy delivered to a heater ink ejection element would be a function of the number of ink ejection elements being energized at the same time.

Additional details regarding the control of inkjet printheads are described in U.S. patent application Ser. No. 09/016,478, filed Jan. 30, 1998, entitled "Hybrid Multi-Drop/Multi-Pass Printing System" and U.S. patent application Ser. No.08/962,031, filed Oct. 31, 1997, entitled "Ink Delivery System for High Speed Printing" which are herein incorporated by reference.

In printheads having smart integrated logic on the printhead, data is transmitted to the printhead and the printhead decodes this data into address and primitive control signals. Data for all address lines must be sequentially sent to the printhead for each address line. In the time domain, this is one ejection period. In the physical location domain, this is called one column. These smart drive printheads have a large number of resistors making it difficult to have a direct connection for the address lines, primitive lines and primitive grounds. Accordingly, in smart drive printheads each firing resistor may not have a dedicated connection. Without a dedicated connection there may be variations in delivered energy to a resistor due to parasitic resistances. A set of resistors, or a primitive, is powered by a single voltage line that receives power via an electrical interconnection between the print cartridge electrical pads 86 and corresponding pads on the printer carriage 16. Power to the carriage 16 from the regulated voltage 72 on the printer 10 is supplied by a flexible cable, or ribbon cable. The voltage line continues from the electrical contact pads 86 on a flexible electrical tape circuit 80 to a bonding connection to electrodes 87 on the printhead die 88. The printhead die 88 contains the firing resistors 44 and other control electronics, such as the drive transistors 48. The voltage line continues out from the printhead die 88 via a bonding connection to electrodes 87 on the printhead die 88 through the flexible electrical tape circuit 80 to print cartridge electrical pads. The voltage line continues to the carriage electrical interconnection between the print cartridge electrical pads 86 and to corresponding pads on the printer carriage 16. The voltage line continues from the carriage 16 to the voltage regulator 72 via the flexible cable, or ribbon cable.

The specific dot pattern placed on the media in each pass and the way in which these different dot patterns add up to a final complete image, is known as a "printmode." The concept of printmodes is a useful and well-known technique of laying down in each pass of the printhead only a fraction of the total ink required in each section of the image, so that any areas left white in each pass are filled in by one or more later passes. One-pass mode operation is used for high throughput. The one pass mode is one in which all dots to be fired on a given row of dots are placed on the medium in one swath of the print head, and then the print medium is advanced into position for the next swath.

A multiple-pass printmode is a print pattern wherein a fraction of the dots available for a given row of available dots per swath are printed on each pass of the printhead, so multiple passes are needed to complete the printing for a given row. In a multiple-pass printmode, each pass generally prints a fraction of all the ink drops to be printed roughly equal to the reciprocal of the number of passes. Accordingly, the number of resistors being fired is also a fraction equal roughly to the reciprocal of the number of passes.

Lines, text and graphics are normally printed with uniform density. In one-pass or two-pass printmodes, this requires a high firing frequency for black and saturated colors. High firing frequency has a negative effect on the drop velocity, drop volume, drop shape and drop trajectory of the drops ejected. Output printed with high frequency and uniform density text and lines exhibits defects that are the result of the sub-optimal firing conditions caused by firing at high frequency. Accordingly, there is a need for a solution to the problem of text and graphics degradation and edge roughness that is associated with high frequency firing. The present invention provides dramatically improved edge roughness and text print quality without the need for changing any aspect of the pen architecture (drop weight, refill speed, directionality), the print resolution, or print throughput. This image processing change is compatible with any inkjet printing system.

Inkjet printers typically operate by firing a single drop, or by firing many drops in succession. Each drop fired has an effective firing frequency equal to 1/(time since the firing of the previous drop). Thus, the effective firing frequency of the first drop in a string of drops in succession is low. Such drops typically have good trajectories and good shapes. The effective firing frequency of all remaining drops in a string of drops is higher. Such drops typically have poor trajectories and poor shapes. This causes the appearance of a slight blurring, irregularity or dirtiness of the leading and trailing edges 104 of what has been printed. This will continue to be the case until the firing is interrupted, and the system has time to stabilize. This process will then repeat.

The present invention consists of creating image processing that identifies edges and area fills. Accordingly, the printer firmware analyzes an image that is to be printed, to identify edges and area fills. Such analysis requires scanning the overall image or parts of it for groupings of pixel columns or rows in excess of the optimal widths or heights, respectively, of edges. In principle this image-element identifying or sensing step may be performed to completion for the entire image before printing of any part of the image begins, or may be performed for an image element before printing of any part of that element begins. Still another possibility is to perform the analysis on a progressive basis in which sensing continues while printing proceeds. This type of image processing is well known by those skilled in the art.

Figure 5:
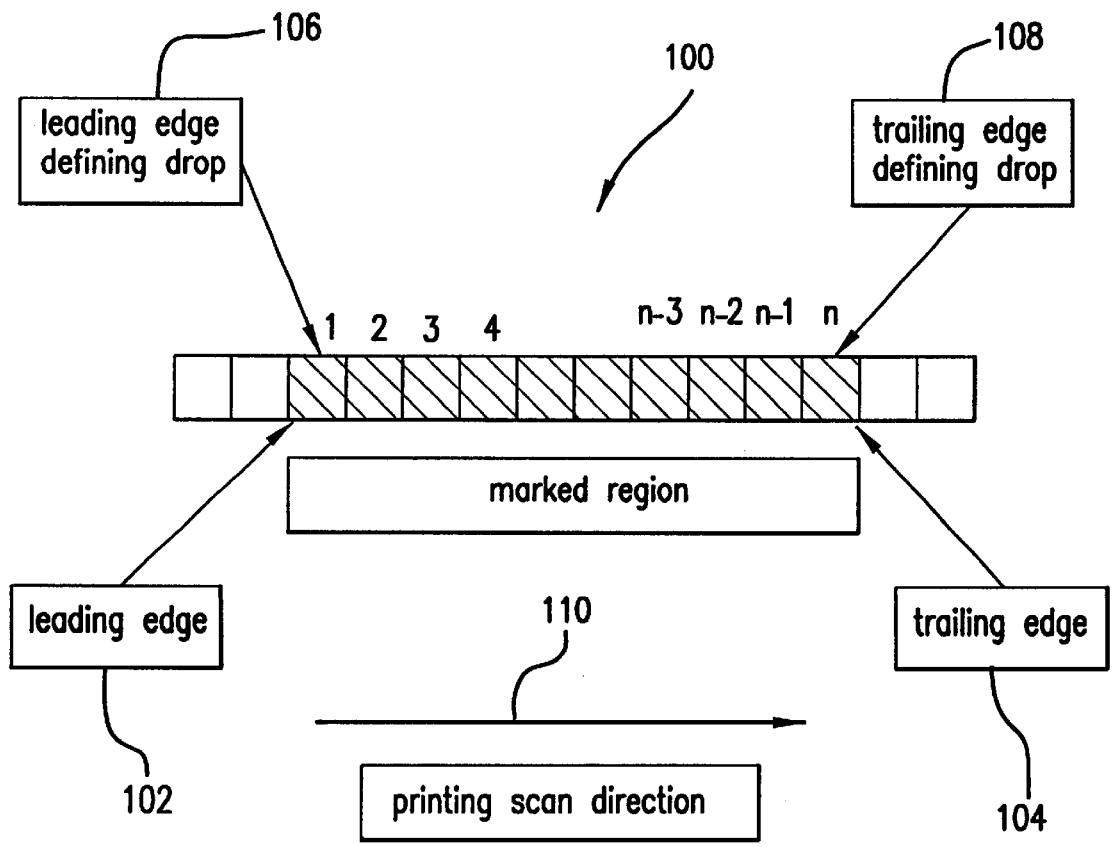
FIG. 5 illustrates a marked region including leading and trailing edges and leading and trailing edge defining drops.

Referring to FIG. 5, as used herein, the terms leading edge and trailing edge 104 are determined by the scan direction 110 of the printer carriage 16. Leading edge 102 designates the first edge of the marked region 100 and trailing edge 104 refers to the last edge of the marked region 100. These regions are of great importance because they are often printed at the maximum firing frequency of the print cartridge 12 and are particularly sensitive to the effects associated with those high firing frequencies.

A single print swath typically contains both marked 100 and unmarked regions. When a string of drops is fired it creates a marked region 100. Such a marked region 100 has a leading edge 102 and a trailing edge 104. This is created by a leading edge defining drop 106 and a trailing edge defining drop 108. Text, line, and graphic print quality, and specifically the quality of their leading 102 and trailing edges 104, can be affected by both the leading edge defining drop (1) 106, the trailing edge defining drop (n) 108, and by the drops near them, for example, drops (2) and (n−1).

Figure 6:
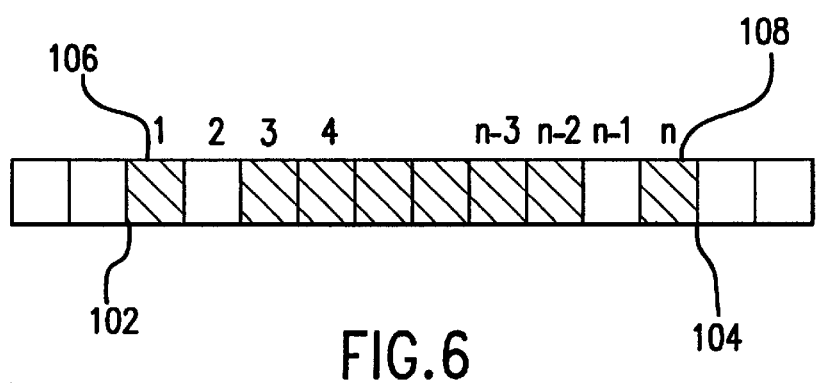
FIG. 6 illustrates a first embodiment of the present invention.

The present invention improves print quality by removing the drops near the edge defining drops 106, 108. As an example, referring to FIG. 6, consider the removal of drops fired into positions 2 and n−1. Such action results in print quality benefits from two reasons. First, the trailing edge defining drop (n) 108 is fired at a low frequency. In this case, at half the frequency of printing without the benefit of this invention. This lower firing frequency results in drops that have better trajectory, and better drop shape. This improves the print quality of the trailing edge 104. The second benefit arises from the placement of any high frequency firing. Specifically, all high frequency firing is moved further into the interior of the marked region 100, where abnormalities are not visible. This improves the quality of both leading 102 and trailing 104 edges.

Figure 7A:
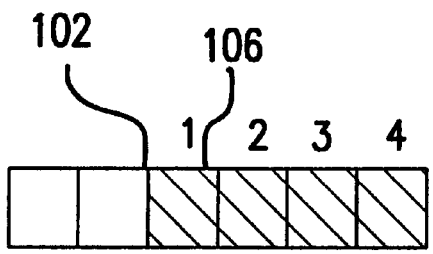
FIGS. 7A–7B illustrates a second embodiment of the present invention.
Figure 7B:
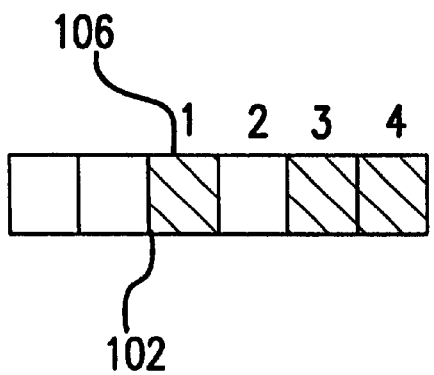

Referring to FIG. 7A, on the leading edge 102, without this invention, the second drop fired is fired in position 2 at high frequency. It will have poor trajectory and poor drop shape. Since it is located very near the leading edge 102 of the marked region 100, its effects can be seen on leading edge 102 print quality. Referring to FIG. 7B, in accordance with the present invention, the second drop fired is in position 3, and is fired at one-half the frequency of FIG. 7A and therefore has good drop trajectory and drop shape. Only the third drop fired, which is fired at position 4, will be the first drop fired at high frequency. Since it is located far into the interior of the marked region 100, its effect on leading edge 102 print quality is minimal.

Figure 8A:
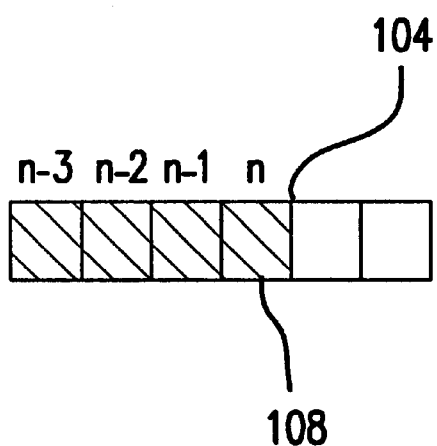
FIGS. 8A–8B illustrates a third embodiment of the present invention.
Figure 8B:
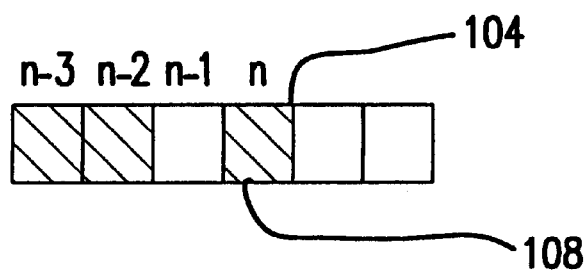

Referring to FIG. 8A, on the trailing edge 104, without this invention, the next to last drop fired is fired in position n−1 at high frequency. Thus, it will have poor trajectory and poor drop shape. Since it is located very near the trailing edge 104 of the marked region 100, its effects can be seen on the trailing edge 104 print quality. Referring to FIG. 8B, in accordance with the present invention, the next to last drop fired is in position n−2. It is fired at high frequency, but since it is located far into the interior of the marked region 100, its effect on trailing edge 104 quality is minimal.

Figure 9A:
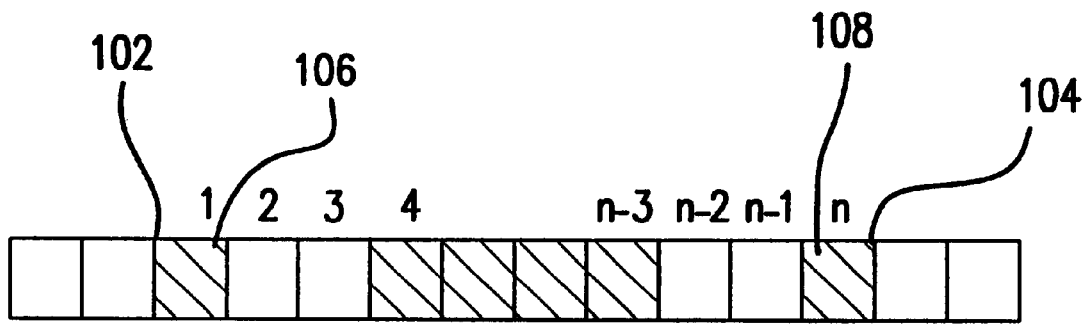
FIGS. 9A–9B illustrates a fourth embodiment of the present invention.

Referring to FIG. 9A, in another embodiment of the present invention drops from positions 2, 3, n−2, and n−1 would be to removed. The number of drops removed would be determined by the severity of print quality defect when firing at high frequency, versus the loss of edge darkness from not printing into all positions. In this example, the firing frequency of the drop fired into position "n" is only one third that of firing without this invention. The location of high frequency firing is driven even further into the interior of the marked region 100, to positions 5 and n−3.

Figure 9B:
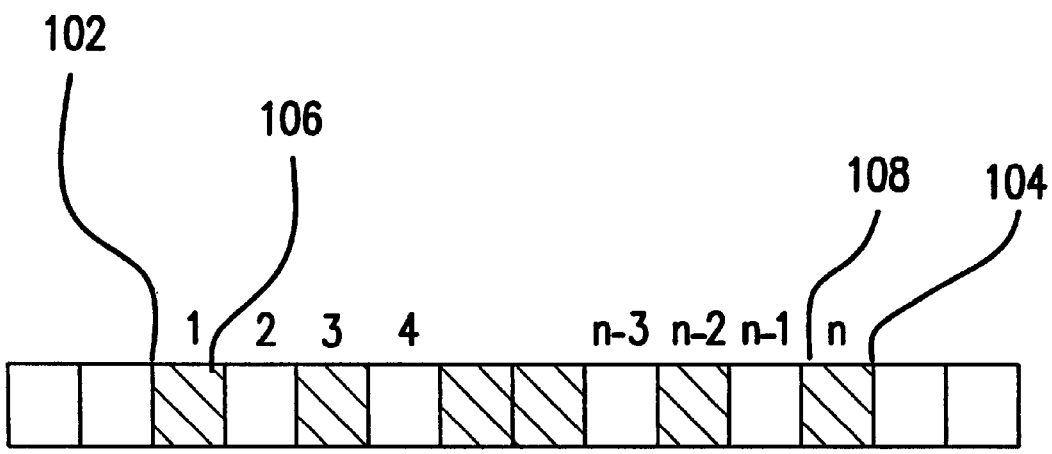

Referring to FIG. 9B, in another embodiment of the present invention, drops from positions 2, 4, n−3, and n−1 would be removed. This would maintain good edge darkness while moving the high firing frequency drops even further into the interior of the marked region 100 to positions 6 and n−4.

Of course, it will be appreciated that many other combinations other than those set forth above are possible with the present invention. The foregoing examples are merely meant to be illustrative of some of the possibilities.

Figure 10A:
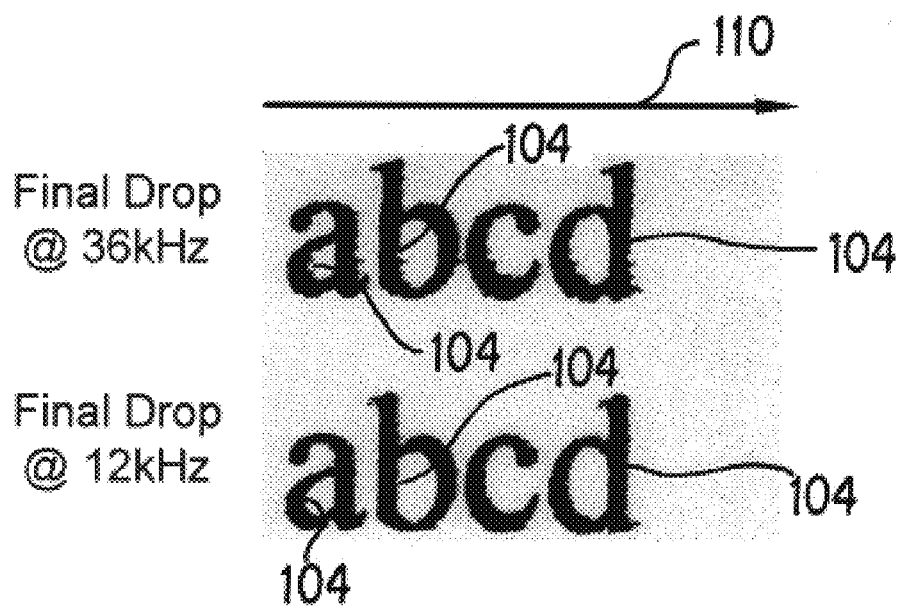
FIGS. 10A–10B illustrates the printing of black and color text with and without use of the present invention for the printing of a trailing edge.

FIG. 10A shows enlarged images of black text in 10 pt Times New Roman font printed in a one- pass printmode at a carriage speed of 30 inches per second in accordance with the present invention. Fig. 10A shows standard printing of the text where the final drop is fired at 36 kHz and printing of the text that was modified in accordance with the present invention to remove drops immediately before the trailing edges 104. In FIG. 10A two drops were removed to bring the effective firing frequency of the final drop at the edge down to 12 kHz. The trailing edge 104 is much less rough when printed in accordance with the present invention.

Figure 10B:
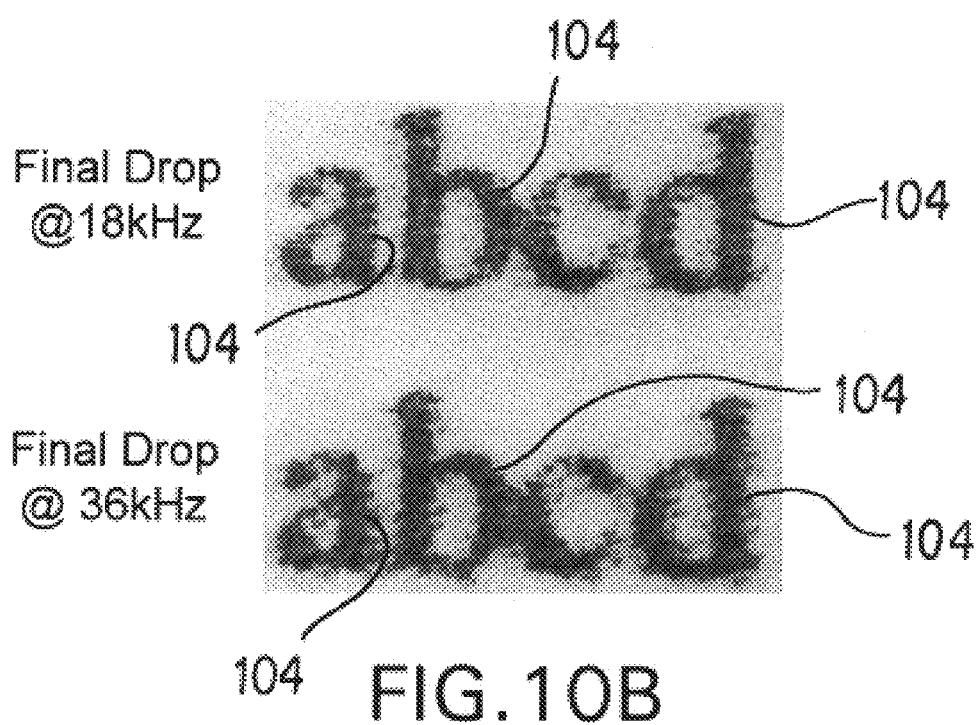

FIG. 10B shows the same technique applied to color printed text. In this case the text is in 4 pt Times New Roman font. As seen in FIG. 10B skipping a single drop to create an effective 18 kHz firing frequency drop at the trailing edge 104 yields excellent results over the 36 kHz drop trailing edge 104.

Figure 11:
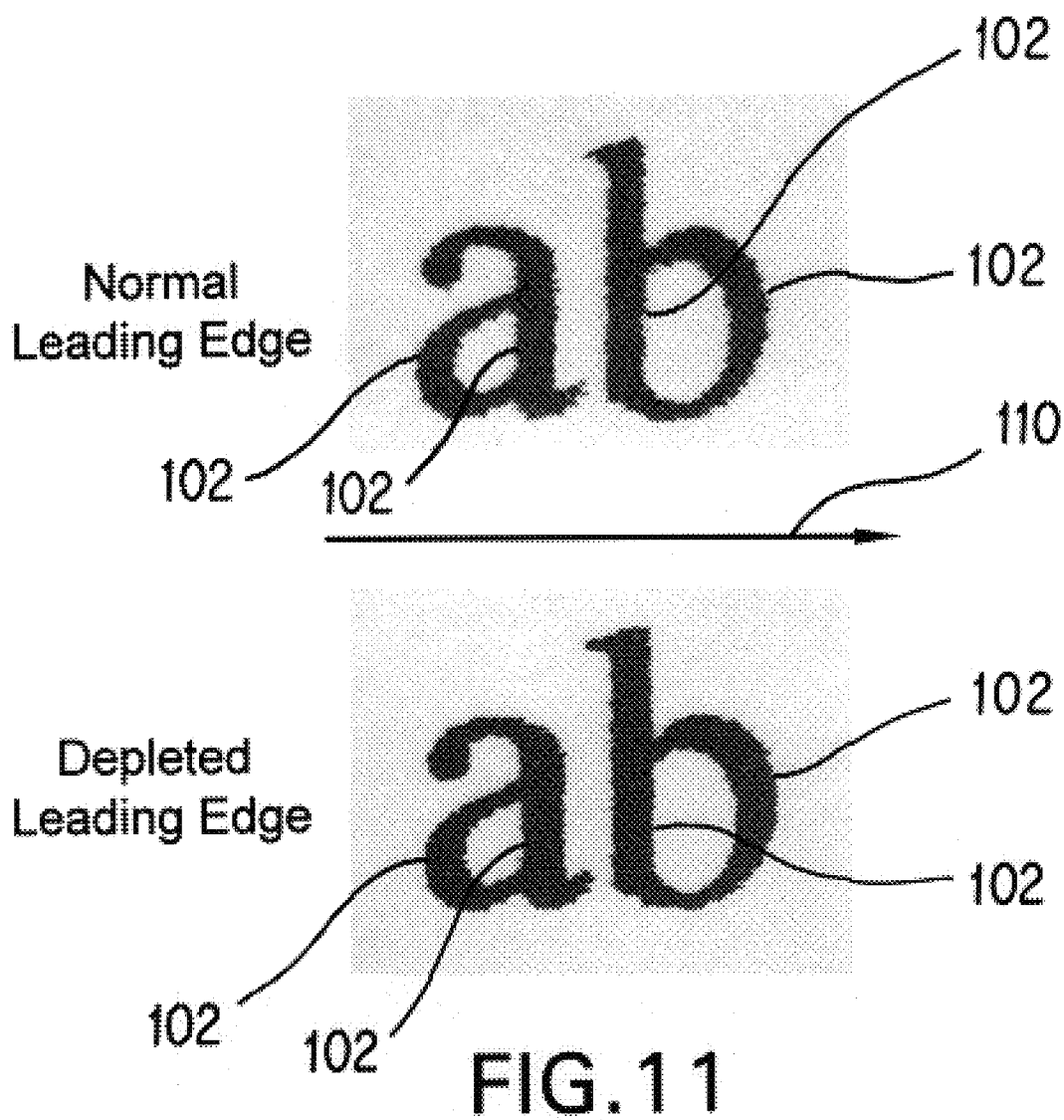
FIG. 11 illustrates the printing of color text with and without use of the present invention for the printing of a leading edge.

A similar benefit can be achieved by depleting the leading edge 102 in the same fashion. FIG. 11 demonstrates the benefit of leading edge 102 depletion on 10 pt Times New Roman font text. In FIG. 11A, the text is printed with fully saturated leading edges 102. These characters have poor leading edges 102 characterized by "fangs." These fangs are created by the second drop which is fired at 36 kHz. In FIG. 11B are the same characters with the leading edge 102 depleted by removing the second drop after the leading edge 102. By doing this, the second drop is fired at 18 kHz. As a result, with two drops per pixel, the first 36 kHz drop is shifted a full dot column away from the leading edge 102. Though this drop still creates a fang, the fang lands on the interior color fill rather than white space and thus does not create a defect. The minimum number of skipped firings of drops required is selected to balance the demonstrated benefits with the saturation loss resulting from the removal of the drops.

While the above is discussed in terms of specific and alternative embodiments, the invention is not intended to be so limited. The foregoing techniques of the present invention can be applied to any firing frequency, dots per inch print resolution, number of drops per pixel, or printer carriage speed.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for incremental printing with an inkjet swath printer by depositing multiple drops of an ink from a printhead in each column of an image, in each scanning pass of the printhead over a print medium, comprising:

obtaining the image;

analyzing the image to determine which drops of ink will define trailing edges in each row of the image element with respect to a scanning direction;

removing at least one drop of ink preceding the drop defining the trailing edges in each of the rows; and depositing the remaining drops of the ink on the medium while passing the printhead over the media in the scanning direction.

2. The method of claim 1 where in said removing step, the at least one drop is the one drop immediately before the drop defining the trailing edge.

3. The method of claim 1 where in said removing step, the at least one drop are the two drops immediately before the drop defining the trailing edge.

4. The method of claim 1 where in said removing step, the at least one drop are the three drops immediately before the drop defining the trailing edge.

5. The method of claim 1 where in said removing step, the at least one drop are the first and third drops before the drop defining the trailing edge.

6. A method for incremental printing with an inkjet swath printer by depositing multiple drops of an ink from a printhead in each column of an image, in each scanning pass of the printhead over a print medium, comprising:

obtaining the image;

analyzing the image to determine which drops of ink will define leading edges in each row of the image element with respect to a scanning direction;

removing at least one drop of ink after the drop defining the leading edges in each of the rows; and depositing the remaining drops of the ink on the medium while passing the printhead over the media in the scanning direction.

7. The method of claim 6 where in said removing step, the at least one drop is the one drop immediately after the drop defining the leading edge.

8. The method of claim 6 where in said removing step, the at least one drop are the two drops immediately after the drop defining the leading edge.

9. The method of claim 6 where in said removing step, the at least one drop are the three drops immediately after the drop defining the leading edge.

10. The method of claim 6 where in said removing step, the at least one drop are the first and third drops after the drop defining the trailing edge.

11. A method of printing with an inkjet printing system scanning over a print medium, comprising:

providing a printhead having a supply of ink and a plurality of ink ejection chambers for ejecting ink onto the print medium, each of the ink ejection chambers depositing the ink onto a corresponding row, the ink ejection chambers ejecting ink drops in a range of frequencies between a base firing frequency and a maximum firing frequency;

obtaining an image;

analyzing the image to determine which drops of ink will define trailing edges in each row of the image element with respect to a scanning direction;

ejecting the drop of ink defining the trailing edges in each of the rows at an ejection frequency less than the maximum frequency; and depositing the remaining drops of the ink on the medium while passing the printhead over the media in the scanning direction.

12. The method of claim 11 wherein in said ejecting step the ejection frequency is one-half the maximum frequency.

13. The method of claim 11 wherein in said ejecting step the ejection frequency is one-third the maximum frequency.

14. The method of claim 11 wherein in said ejecting step the ejection frequency is one-fourth the maximum frequency.

15. The method of claim 11 wherein in said ejecting step the ejection frequency is one-fifth the maximum frequency.

16. A method of printing with an inkjet printing system scanning over a print medium, comprising:

providing a printhead having a supply of ink and a plurality of ink ejection chambers for ejecting ink onto the print medium, each of the ink ejection chambers depositing the ink onto a corresponding row, the ink ejection chambers ejecting ink drops in a range of frequencies between a base firing frequency and a maximum firing frequency;

obtaining an image;

analyzing the image to determine which drops of ink will define leading edges in each row of the image element with respect to a scanning direction;

ejecting the drop of ink defining the leading edges in each of the rows at an ejection frequency less than the maximum frequency; and depositing the remaining drops of the ink on the medium while passing the printhead over the media in the scanning direction.

17. The method of claim 16 wherein in said ejecting step the ejection frequency is one-half the maximum frequency.

18. The method of claim 16 wherein in said ejecting step the ejection frequency is one-third the maximum frequency.

19. The method of claim 16 wherein in said ejecting step the ejection frequency is one-fourth the maximum frequency.

20. The method of claim 16 wherein in said ejecting step the ejection frequency is one-fifth the maximum frequency.

* * * * *